United States Patent [19]
Wenger et al.

[11] Patent Number: 5,394,758
[45] Date of Patent: Mar. 7, 1995

[54] TWIN PATH CORIOLIS-TYPE MASS FLOW SENSOR WITH CURVED CONDUITS

[75] Inventors: Alfred Wenger, Neftenbach; Ennio Bitto, Aesch; Christian Schütze, Basel, all of Switzerland

[73] Assignee: Endress + Hauser Flowtec AG, Switzerland

[21] Appl. No.: 153,599

[22] Filed: Nov. 16, 1993

[30] Foreign Application Priority Data

Nov. 18, 1992 [EP] European Pat. Off. ........... 92810894

[51] Int. Cl.[6] .............................................. G01F 1/84
[52] U.S. Cl. .................................................. 73/861.38
[58] Field of Search ......................... 73/861.37, 861.38

[56] References Cited

U.S. PATENT DOCUMENTS

| | | | |
|---|---|---|---|
| 4,127,028 | 11/1978 | Cox et al. | |
| 4,763,530 | 8/1988 | Mizerak | 73/861.38 |
| 4,768,384 | 9/1988 | Flecken et al. | 73/861.02 |
| 4,793,191 | 12/1988 | Flecken et al. | 73/861.38 |
| 4,801,897 | 1/1989 | Flecken | 73/861.38 |
| 4,811,606 | 3/1989 | Hasegawa et al. | 73/861.38 |
| 4,823,613 | 4/1989 | Cage et al. | 73/861.38 |
| 4,934,196 | 6/1990 | Romano | 73/861.38 |
| 5,275,061 | 1/1994 | Young et al. | 73/861.38 |

FOREIGN PATENT DOCUMENTS

| | | |
|---|---|---|
| 0083144 | 7/1983 | European Pat. Off. |
| 0261435 | 3/1988 | European Pat. Off. |
| 0261436 | 3/1988 | European Pat. Off. |
| 2394065 | 1/1979 | France |
| 3816045 | 5/1989 | Germany |
| 3048729 | 3/1991 | Japan |
| 89/11635 | 11/1989 | WIPO |

OTHER PUBLICATIONS

E. Amberger et al., "Unmittelbare Messung des Massedurchflusses mit Hilfe der Coriolis-Kraft", Automatisierungstechnische Praxis, Heft 5, pp. 224–230, 1988.

B. Vögtlin et al., "Direct Measurement of Mass Flow Using the Coriolis Force", Flowtec AG Flow Measurement, eight pages, date unknown.

*Primary Examiner*—Richard E. Chilcot, Jr.
*Assistant Examiner*—Harshad Patel
*Attorney, Agent, or Firm*—Barnes & Thornburg

[57] ABSTRACT

This mass flow sensor has a vibration-body arrangement through which flows a fluid to be measured and which comprises the following parts: two plane, congruent tube loops each consisting of a straight inlet tube with an inlet end, a straight outlet tube with an outlet end, which ends are fixed in a common mount, and a tube bend interconnecting the respective inlet tube and the respective outlet tube. Mounted at the junctions of the respective inlet and outlet tubes and the associated tube bends is a plate with holes which correspond to the outside diameter of the straight tubes and the tube bends and in which the latter are fixed to determine a respective vibration node. A vibration exciter sets the two tube bends into opposite sympathetic vibrations perpendicular to their respective planes, and two sensors are spaced along the straight tubes for sensing the vibrations of the latter.

4 Claims, 2 Drawing Sheets

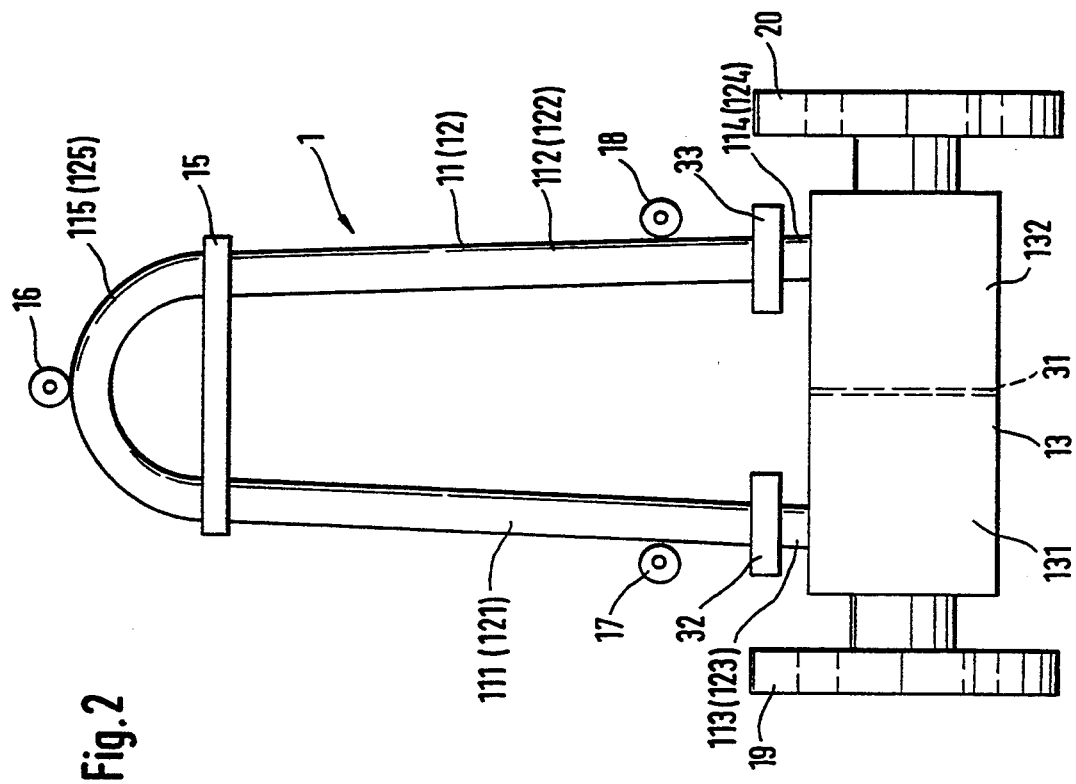
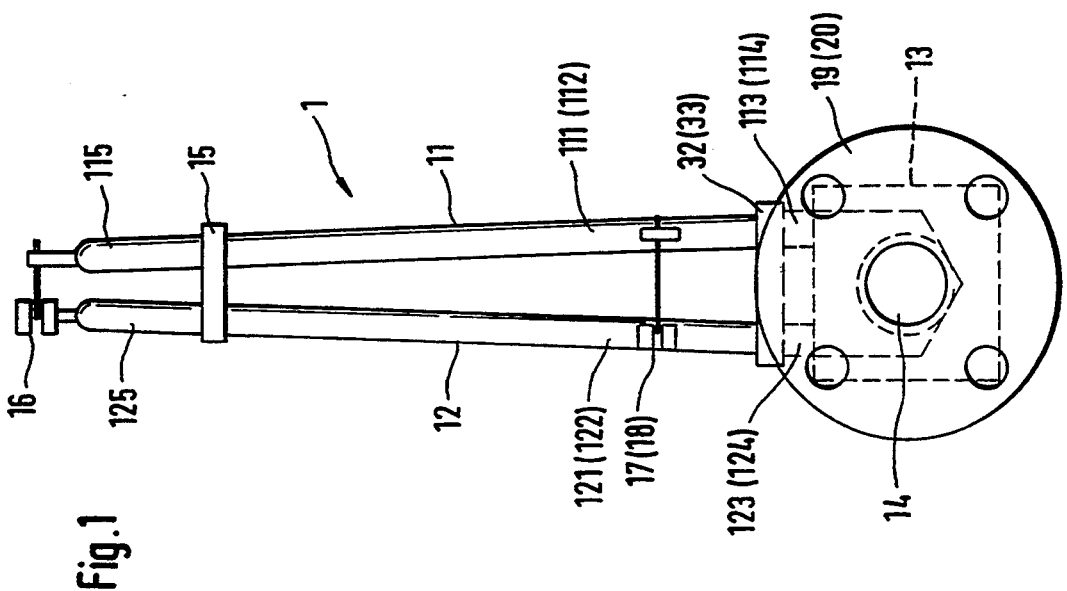

TWIN PATH CORIOLIS-TYPE MASS FLOW SENSOR WITH CURVED CONDUITS

FIELD OF THE INVENTION

The present invention relates to a mass flow sensor comprising a vibrating-body arrangement working on the Coriolis principle through which flows a fluid to be measured.

BACKGROUND OF THE INVENTION

In the extensive prior art relating to Coriolis-type mass flow meters with vibrating bodies consisting of tubes, there are only two basic tube shapes, namely straight tubes and arbitrarily bent or even twisted tubes, among which, for technical reasons, the U-shaped tube loops, i.e., those with a straight inlet tube with inlet end and with a straight outlet tube with outlet end as well as with a tube bend interconnecting the inlet tube and outlet tube, are the preferred tube shapes. With both tube shapes, for reasons of symmetry, use is generally made of two tube loops which extend parallel to each other in two parallel planes in the state of rest.

One of the two variants of mass flow meters, the one with two parallel straight tubes, is described, for example, in U.S. Pat. Nos. 4,768,384 and 4,793,191, which are incorporated herein by reference, and the other variant, with two parallel U-shaped tube loops, is described, for example, in U.S. Pat. No. 4,127,028.

In each of the two first-mentioned U.S. Pat. Nos. 4,768,384 and 4,793,191, the following features are described together: mass flow meter with a vibrating-body arrangement working on the Coriolis principle through which flows a fluid to be measured and which comprises the following parts:
a first straight tube having an inlet end and an outlet end,
a second straight tube having an inlet end and an outlet end,
which two tubes extend parallel to each other in the state of rest,
a vibration exciter which sets the two straight tubes into opposite sympathetic vibrations in the plane containing the axes of the straight tubes, and
two sensors spaced along the straight tubes for sensing the vibrations of the latter, as well as
with driver electronics for the vibration exciter, and
with evaluation electronics
which determine the mass rate of flow from the phase difference of the sensor signals and/or the density of the fluid from the vibration frequency.

On the other hand, the following features are described together in the above-mentioned U.S. Pat. No. 4,127,028: mass flow meter with a vibrating-body arrangement working on the Coriolis principle through which flows a fluid to be measured and which comprises the following parts:
a first U-shaped tube loop and
a second U-shaped tube loop
which extend parallel to each other in two parallel planes in the state of rest and each consist of
a straight inlet tube with an inlet end,
a straight outlet tube with an outlet end, which ends are fixed in a common mount, and
a tube bend interconnecting the respective inlet tube and the respective outlet tube,
a vibration exciter which sets the two tube loops into opposite sympathetic vibrations perpendicular to their respective planes, and
two sensors spaced along the straight tubes for sensing the vibrations of the latter,
with driver electronics for the vibration exciter, and
with evaluation electronics
which determine the mass rate of flow from the phase difference of the sensor signals and/or the density of the fluid from the vibration frequency.

Each of the two variants of mass flow meters has its advantages, but also disadvantages. Mass flow meters with U-shaped tube loops are not self-discharging in all mounting positions, and they are not nearly as insensitive to vibrations stemming from the conduit as mass flow meters with exclusively straight tubes. In addition, due to the Coriolis forces, the tube loops are subject to distortion out of the plane defined by their rest position.

Mass flow meters with exclusively straight tubes are, under certain circumstances, more sensitive to thermal shock as those with U-shaped tube loops, and the dependence of the measurement result on the pressure of the fluid may be stronger than with U-shaped tube loops, which becomes particularly apparent in case of variations in the pressure of the fluid.

In JP-A 3-48729 and the abstract thereof, a few features of mass flow meters with straight tubes and a few features of mass flow meters with U-shaped tubes are described together: mass flow meter with a vibrating-body arrangement working on the Coriolis principle through which flows a fluid to be measured and which comprises the following parts:
a U-shaped tube loop consisting of
a straight inlet tube with an inlet end,
a straight outlet tube with an outlet end,
which ends are fixed in a common first mount, and
a tube bend interconnecting the inlet tube and outlet tube,
a second mount which is provided at the transitions from the inlet and outlet tubes to the associated tube bend, is firmly connected with the first mount, and
in which the straight tubes are fixed to determine a vibration node,
a vibration exciter mounted in the middle of the two straight tubes
which sets the tubes, fixedly linked at this point via a spacing piece, into parallel sympathetic vibrations in the plane containing the axes of the straight tubes,
and a sensor mounted between the straight tubes for sensing the vibrations of the latter,
with driver electronics for the vibration exciter, and
with evaluation electronics
which determine the mass rate of flow from the phase difference of the sensor signals.

The invention as claimed serves to eliminate the above-mentioned disadvantages by providing a mass flow which combines the advantages of the two above-mentioned variants cleverly and better than the last-mentioned prior art mass flow meter.

SUMMARY OF THE INVENTION

To accomplish this, the invention consists in a mass flow sensor
with a vibrating-body arrangement working on the Coriolis principle through which flows a fluid to be measured and which is designed to be installed in a conduit and comprises the following parts:
a first tube loop and
a second tube loop which
each lie in one plane,
are congruent and each consist of
a straight inlet tube with an inlet end,
a straight outlet tube with an outlet end,
which ends are fixed in a common mount,
and a tube bend interconnecting the inlet tube and the outlet tube,
a plate mounted at the transitions from the inlet and outlet tubes to the associated tube bend and having holes which correspond to the outside diameter of the straight tubes and the tube bends and in which the latter are fixed to determine a respective vibration node,
at least one vibration exciter which sets the two tube bends into opposite sympathetic vibrations perpendicular to their respective planes, and
at least two sensors spaced along the straight tubes for sensing the vibrations of the latter The invention has the following principal advantages. The straight tubes vibrate only like a bar clamped at both ends, i.e., only in modes as occur exclusively in the above variant with straight tubes, in which the above-mentioned distortion is avoided; because of the U-shape chosen, the sensitivity to thermal shock is negligible in comparison with the variant with straight tubes, and the pressure dependence is substantially reduced.

According to a further advantageous aspect of the invention, the planes of the tube loops may be parallel to each other.

According to another advantageous aspect of the invention, the inlet tube in each tube-loop may extend parallel to the outlet tube.

BRIEF DESCRIPTION OF THE DRAWINGS

The invention will become more apparent from the following description of embodiments taken in conjunction with the accompanying drawings, in which:

FIG. 1 is a schematic front view of a first mass flow sensor in the direction of the conduit;

FIG. 2 is a schematic side view of the mass flow sensor of FIG. 1;

DETAILED DESCRIPTION OF THE DRAWINGS

Figure 4:
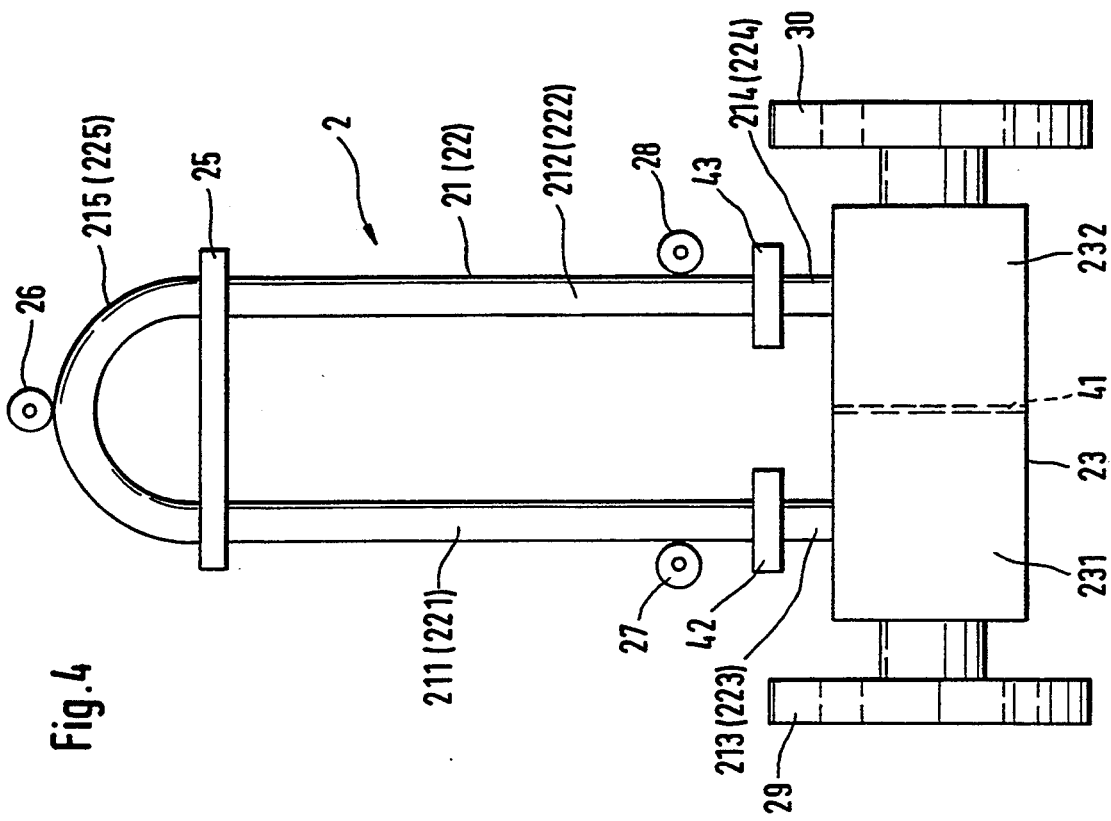
FIG. 4 is a schematic side view of the mass flow sensor of FIG. 2.

Throughout the figures of the drawings, the reference characters of parts which are present but are covered by drawn parts are given in parentheses beside the reference characters of the covering parts.

FIG. 1 shows a mass flow sensor 1 in a front view in the direction of a conduit, and FIG. 2 shows this portion in a side view. The mass flow sensor 1, which can be installed in a conduit of a given diameter through which flows a fluid to be measured, but which is not shown to simplify the illustration, has a mount 13 which is connectable with the conduit in a pressure-tight manner via flanges 19, 20.

In a direction perpendicular to the axis of the conduit and the mount 13, two tube loops 11, 12, which lie in the same plane and are congruent, are attached to the mount 13 in such a way that the fluid can flow from the inlet portion 131 of the mount into each of the tube loops 11, 12.

In the mount 13, an inlet end 113 of a straight inlet tube 111 of the tube loop 11 and an inlet end 123 of a straight inlet tube 112 of the tube loop 12 are fixed to the inlet portion 131 by, e.g., soldering, brazing or welding. To the outlet portion 132 of the mount 13, an outlet end 114 of a straight outlet tube 112 of the tube loop 11 and an outlet end 124 of a straight outlet tube 122 of the tube loop 12 are fixed, also by soldering, brazing or welding, for example.

The respective inlet tube 111,121 is connected with the respective outlet tube 112,122 by a tube bend 115, 125. At the transition from the respective inlet tubes 111,121 and outlet tubes 112, 122 to the associated tube bends 115, 125, a plate 15 is mounted having holes which correspond to the outside diameter of the straight inlet and outlet tubes and the tube bends and in which the latter are fixed, e.g., by soldering, brazing or welding, to determine a respective vibration node.

In the embodiment of FIGS. 1 and 2, the planes of the tube loops 11, 12 are not parallel, but inclined to each other. From FIG. 2 it is apparent that the inlet and outlet tubes of each tube loop are not parallel, either, but inclined to each other. As a result of this dual non-parallelism, the mass flow sensor is only little sensitive to mechanical disturbances, particularly vibrations or shocks, which stem from the conduit.

The mount 13 contains a partition 31 which separates the inlet portion 131 from the outlet portion 132 flow-wise. Instead of the partition 31, two bent manifolds may be provided in the mount 13 which deflect the direction of flow as uniformly as possible toward the straight tubes 111,121 and 112, 122, respectively, and distribute the entering fluid to, or collect the emerging fluid from, the two tube loops 11, 12.

Near the respective fixing points of the tube loops 11, and 12 at the mount 13, vibration-node plates 32 and 33 may be provided which firmly interconnect the inlet tubes 111, 121 and the outlet tubes 112, 122, respectively. This connection, too, may be made by soldering, brazing or welding. The fixing point can thus be relieved of stress.

Mounted at the vertices of the tube bends 115, 125 is a vibration exciter 16 which sets the latter into opposite sympathetic vibrations perpendicular to their respective planes, and which may be, for example, of the type described in the above-mentioned U.S. Pat. No. 4,768,384 or in applicant's U.S. Pat. No. 4,801,897. The vibration exciter 16 is an electrodynamic exciter with a coil secured to the tube bend 125 and an armature secured to the tube bend 115.

The vibrations of the tube bends 115, 125 are transmitted to the inlet-tube pair 111,121 and the outlet tube pair 112, 122 such that each tube pair is also excited into opposite sympathetic vibrations. The vibrations of the inlet-tube pair are synchronous with those of the outlet-tube pair, and the vibration plane of each of these tube pairs coincides with the plane containing the axes of the tubes of the respective pair. The vibration exciter 16 is fed by driver electronics (not shown). The latter may be, for example, of the type described in the above-mentioned U.S. Pat. No. 4,801,897.

In FIG. 1, the visible tube pair 111,121 thus vibrates in the plane of the paper, while in FIG. 2, the vibrations are perpendicular to the plane of the paper. Consequently, the parallel, joint vibration of the straight portions of each tube loop in the plane of the latter, mentioned in the above Japanese patent disclosure.

Spaced along the straight tubes, preferably at equal distances from the vibration exciter 16, are two sensors 17 18 for sensing the vibrations of these tubes. These sensors may be, for example, optoelectronic sensors as are described in the above-mentioned U.S. Pat. No. 4,801,897, or electromagnetic sensors as are explained, for example, in European Patent 83 144.

The sensors 16, 17 are connected to evaluation electronics (not shown) which determine the mass rate of flow from the phase difference of the sensor signals and/or the density of the fluid from the vibration frequency. Evaluation electronics for the above-mentioned optoelectronic sensors are described, for example, in the journal "Automatisierungstechnische Praxis atp", 1988, No. 5, pages 224 to 230.

Figure 3:
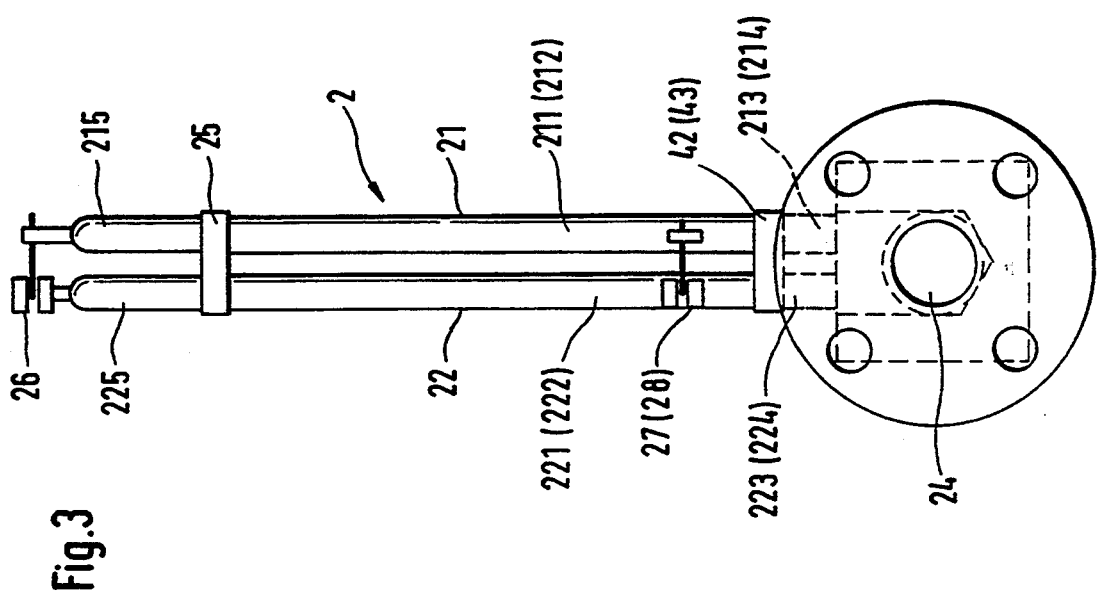
FIG. 3 is a schematic front view of a second mass flow sensor in the direction of the conduit.

In the second embodiment, shown in FIGS. 3 and 4, both the planes of the tube loops 21, 22 and the respective inlet tubes 211, 221 and outlet tubes 212, 222 of these loops are parallel to each other. With this design, a particularly good symmetry of the mass flow sensor 2 is obtained.

The mass flow sensor 2, shown in FIG. 3 in a front view in the direction of the conduit and in FIG. 4 in a side view, includes a mount 23 which is connectable with the conduit in a pressure-tight manner via flanges 29, 30.

In a direction perpendicular to the axis of the conduit and the mount 23, two congruent, plane tube loops 21, 22 are secured to the mount 23 in such a way that the fluid can flow from the inlet portion 231 of the mount into each of the tube loops. In the mount 23, an inlet end 213 of the straight inlet tube 211 of the tube loop 21 and an inlet end 223 of the straight inlet tube 221 of the tube loop 22 are fixed to the inlet portion 231. To the outlet portion 232 of the mount 23, an outlet end 214 of the straight outlet tube 212 of the tube loop 21 and an outlet end 224 of the straight outlet tube 222 of the tube loop 22 are fixed.

Each inlet tube 211,221 is connected with the associated outlet tube 212, 222 via a tube bend 215, 225. Mounted at the transitions from respective inlet tube 211,221 add outlet tube 212,222 to the associated tube bend 215, 225 is a plate 25 with holes which correspond to the outside diameter of the straight inlet and outlet tubes and the tube bends and in which the latter are fixed to determine a respective vibration node.

The mount 23 contains a partition 41 which separates the inlet portion 231 from the outlet portion 232 flowwise. Instead of the partition 41, the above-mentioned manifolds may be provided.

Near the respective fixing points of the tube loops 21 and 22, vibration-node plates 42 and 43 may be provided which firmly interconnect the inlet tubes 211,221 and the outlet tubes 212, 222, respectively. The fixing point can thus be relieved of stress.

Mounted at the vertices of the tube bends 215, 225 is a vibration exciter 26 which sets the latter into opposite sympathetic vibrations perpendicular to their respective planes, and which may be, for example, of the above-mentioned type. It is an electrodynamic exciter with a coil attached to the tube end 225 and an armature attached to the tube bend 215. The vibration exciter 26 is fed by the above-mentioned driver electronics.

The vibrations of the tube bends 215, 225 excite vibrations of the inlet-tube pair 211,221 and outlet-tube pair 212, 222 which are equivalent to the above-explained opposite sympathetic vibrations. Thus, the respective vibration planes of the tube pairs again coincide with the respective planes containing the axes of the tubes of each tube pair. In FIG. 3, therefore, one of the two vibration planes is the plane of the paper, while in FIG. 4, one of the two vibration planes is a plane perpendicular to the plane of the paper.

Spaced along the straight tubes, preferably at equal distances from the vibration exciter 26, are two sensors 27, 28 for sensing the vibrations of the tubes. These sensors may be of the above-explained type and are connected to suitable evaluation electronics.

In the embodiment of FIGS. 3 and 4, too, the tubes may be fixed by soldering, brazing or welding.

The dual parallelism of the tube loops and their straight tubes of FIGS. 3 and 4 is not an absolute necessity; it is possible to implement only one parallelism while retaining the other nonparallelism of FIGS. 1 and 2. In the case of parallel tube loops, the straight tubes of each tube loop may thus be inclined to each other, or in the case of parallel straight tubes, the planes of the tube loops form an angle. Even with only one of these nonparallelisms, such mass flow sensors are only little sensitive to mechanical disturbances, particularly vibrations or shocks, which stem from the conduit.

Particularly suitable materials for the straight tubes and the tube bends are stainless steels. The nickel alloy known by the name of "Hastalloy" is also well suited.

We claim:

1. A mass flow sensor operating on the Coriolis principle for measuring fluid flow in a conduit, the sensor comprising a first tube in a first plane, a second tube in a second plane, each of the first and second tubes having a straight inlet section providing an inlet end, each of the first and second tubes having a straight outlet section providing an outlet end, the inlet and outlet ends of each of the first and second tubes being coupled to a single mount, each of the first and second tubes having a curved section interconnecting the inlet section and the outlet section, at least one vibration exciter for vibrating the first and second tubes in opposite directions generally perpendicular to their respective planes, at least two sensors located adjacent the straight inlet sections of the first and second tubes and adjacent the straight outlet sections of the first and second tubes for sensing the vibrating only in the straight inlet and outlet sections, a first plate engaging the first and second tubes to establish vibration nodes at the transition between the straight inlet section and the curved section of each tube and at the transition between the straight outlet section and the curved section of each tube, a second plate engaging the inlet sections of the first and second tubes adjacent the mount to establish a vibration node in the inlet sections adjacent the mount, and a third plate engaging the outlet sections of the first and second tubes adjacent the mount to establish a vibration node in the outlet sections adjacent the mount.

2. A mass flow sensor as claimed in claim 1 wherein the planes of the tubes are parallel to each other.

3. A mass flow sensor as claimed in claim 1 wherein the inlet section in each tube extends parallel to the outlet section.

4. A mass flow sensor as claimed in claim 2 wherein the inlet section in each tube extends parallel to the outlet section.

* * * * *